9423½X
D. Wilson.
Grain Winnower.
Patented Feb. 20, 1836.
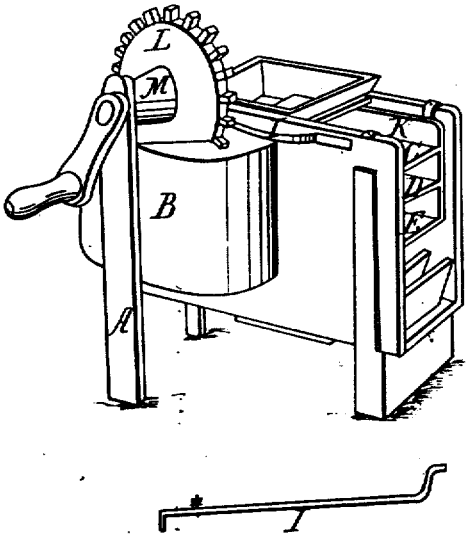
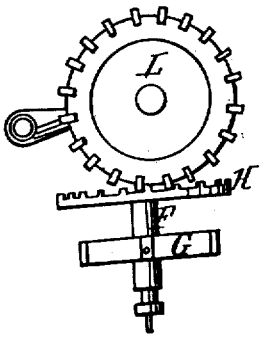
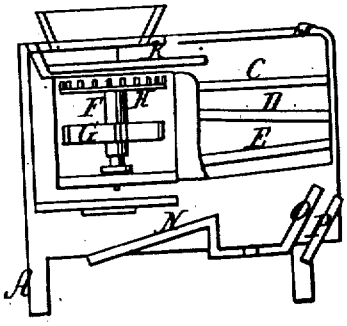

9423½ X

David Wilson, of Johnson, State of Vermont

Letters Patent

The schedule referred to in these Letters Patent and making
part of the same, containing a description in the words of
the said David Wilson, himself of his improvement in the
machine for Winnowing grain
Be it known that I David Wilson of Johnson in the
County of Franklin and State of Vermont, have made a new
and useful improvement in the winnowing Machine, which is
described as follows, reference being had to the annexed draw
ings of the same, making part of this Specification, This Machine
consists of a frame A. made similar to the frame of a common
winnowing machine, open at one end and enclosed at the other
end by a curved casing B. of thin boards forming a [illegible] the
sides being also closed by similar boards. Within this frame
the riddle C. Sieve D. and screen E, are suspended by strips
in an inclined position, the inclination of the screen being in
an opposite direction to that of the sieve. and vibrating horizon
tally; A vertical shaft F. is placed in the centre of the end
having wings or fans G. fastened to it, and a cast-iron spur
wheel H on its upper end, A small crank is attached to the
end of the shaft, to which crank is attached a connecting rod
I leading to the shoe K. to which it is attached for giving the
horizontal vibrating motion to the shoe, A crown wheel L.
works into the spur wheel which crown wheel is placed upon a
horizontal shaft M. on the top of the frame, A hopper of
the usual construction is placed above the shoe, an inclined
board N. is placed below the screen to convey the cleaned
grain to a receiver, There are two other inclined boards O.
P. for the purpose of separating the headings from the chaff 170 9423½X and also from the foul seed which passes through the screen, the grain being put into the hopper motion is given to the machine by [illegible] handle on the end of the horizontal shaft which gives motion to the vertical shaft, with the fans, also to the vibrating rod or shaking staff, which gives motion to the riddle, screen &c. the grain to be winnowed passes down from the hopper upon the riddle sieve, and screen and is there separated from the chaff and dust by the motion of the riddle &c. and by the current of air caused by the fan. What I claim as my invention and which I desire to secure by Letters Patent consists in the arrangement and adaptation of the several parts of the before described horizontal winnowing machine.

David Wilson

Witnesses
Thomas Waterman
Simeon Lyman

Drawings

Exd. [illegible]

624